United States Patent
Alloway et al.

(10) Patent No.: US 12,193,410 B1
(45) Date of Patent: Jan. 14, 2025

(54) HARNESS SYSTEM FOR USE WITH AN ANIMAL

(71) Applicant: Pilot Dogs, Inc, Columbus, OH (US)

(72) Inventors: James Alloway, Richwood, OH (US); Carmen Ciolli, Dublin, OH (US); Martin Patrick Scarpitti, Dublin, OH (US); Emily Kathryn Stokes, Columbus, OH (US); Laura Katherine Lenhart, Columbus, OH (US)

(73) Assignee: Pilot Dogs, Inc, Columbus, OH (US)

( * ) Notice: Subject to any disclaimer, the term of this patent is extended or adjusted under 35 U.S.C. 154(b) by 0 days.

(21) Appl. No.: 18/454,784

(22) Filed: Aug. 23, 2023

(51) Int. Cl.
*A01K 27/00* (2006.01)

(52) U.S. Cl.
CPC .......... *A01K 27/002* (2013.01); *A01K 27/005* (2013.01)

(58) Field of Classification Search
CPC ... A01K 27/002; A01K 27/003; A01K 27/005
See application file for complete search history.

(56) References Cited

U.S. PATENT DOCUMENTS

| | | | | |
|---|---|---|---|---|
| 3,589,341 A | * | 6/1971 | Krebs | A01K 27/005 24/303 |
| 7,389,750 B1 | * | 6/2008 | Rogers | A01K 27/005 119/792 |
| 8,893,663 B2 | * | 11/2014 | Curtis | A01K 1/0263 119/728 |
| 9,004,016 B2 | * | 4/2015 | Stratton | A01K 15/00 119/766 |
| 2005/0263101 A1 | * | 12/2005 | Jenny | A01K 27/002 119/792 |
| 2012/0227220 A1 | * | 9/2012 | Fiedler | A01K 27/005 24/459 |
| 2020/0359604 A1 | * | 11/2020 | Soto | A01K 27/001 |
| 2021/0037792 A1 | * | 2/2021 | Glozbach De Cabarrus | A44B 11/00 |
| 2021/0161104 A1 | * | 6/2021 | Kruse | A01K 27/005 |
| 2021/0392856 A1 | * | 12/2021 | Miller | A44B 11/263 |
| 2022/0079120 A1 | * | 3/2022 | Brian | A01K 27/005 |
| 2022/0354090 A1 | * | 11/2022 | Medeiros | A01K 27/004 |

FOREIGN PATENT DOCUMENTS

DE 102021005884 A1 * 6/2023 ........... A01K 27/002

* cited by examiner

*Primary Examiner* — Michael H Wang
(74) *Attorney, Agent, or Firm* — UB Greensfelder LLP; Matthew J. Schonauer (57) ABSTRACT

A harness system, comprising an integrally formed harness positionable on an animal; a handle member having at least one elongated support; and at least one coupling mechanism comprising a receiver affixed to the harness having a magnetic surface; a latch protruding from the magnetic surface; and an upper retainer, thereby defining a receiving channel; and an extender coupled to the at least one elongated support, wherein the extender includes a release tab and a magnet wherein the magnetic surface attractively engages the magnet on the extender to guide the extender through the receiving channel, and wherein the extender displaces the latch until the extender locks into engagement with the upper retainer.

20 Claims, 8 Drawing Sheets

HARNESS SYSTEM FOR USE WITH AN ANIMAL

CROSS-REFERENCE TO RELATED APPLICATIONS

None.

TECHNICAL FIELD

Exemplary embodiments of the present invention relate generally to the field of mechanical devices and more particularly to animal harnesses.

BACKGROUND OF THE INVENTION

The following description of the background of the invention is provided simply as an aid in understanding the invention and is not admitted to describe or constitute prior art to the invention. The disclosed technology relates in general to animal harness systems and devices, and more specifically to an animal harness system and device that prevents irritation, disturbance, and injury to the animal.

Pet owners are increasingly shifting from conventional neck collars to body harnesses when walking and guiding their pets. This shift from collars to harnesses can be for many reasons, including for example, to eliminate restraining or pulling on the pet's neck or to increase control over the pet's movement. Such harnesses may include a handle for the attachment of a leash; however, these handles are often irritating and bothersome to the pet. Further, the handles may come into contact the pet's back or body when released by the owner, disrupting movement or even causing pain and injury to the pet.

These and other problems are particularly pronounced in systems designed for use by visually impaired persons. In these cases, frequent and prolonged use of a harness system in connection with a guide dog is common, making the need to consider animal comfort even more vital. Current systems also could be improved from a usability standpoint, wherein frequent engagement and disengagement between the user and the harness system is common, and can be particularly troublesome or difficult for visually impaired persons.

Accordingly, there is an ongoing need for a harness system that can quickly and easily be positioned on an animal, while allowing for guidance of the animal without causing disturbance or pain. No known references, taken alone or in combination, are seen as teaching or suggesting the presently claimed harness system.

BRIEF SUMMARY OF THE INVENTION

The following provides a summary of certain example implementations of the disclosed technology. This summary is not an extensive overview and is not intended to identify key or critical aspects or elements of the disclosed technology or to delineate its scope. However, it is to be understood that the use of indefinite articles in the language used to describe and claim the disclosed technology is not intended in any way to limit the described technology. Rather the use of "a" or "an" should be interpreted to mean "at least one" or "one or more".

One implementation of the disclose technology provides a harness system. The harness system comprises an integrally formed harness positionable on an animal; a handle member having at least one elongated support; and at least one coupling mechanism comprising a receiver affixed to the harness having a magnetic surface; a latch protruding from the magnetic surface; and an upper retainer, thereby defining a receiving channel; and an extender coupled to the at least one elongated support, wherein the extender includes a release tab and a magnet wherein the magnetic surface attractively engages the magnet on the extender to guide the extender through the receiving channel, and wherein the extender displaces the latch until the extender locks into engagement with the upper retainer.

The upper retainer may include a first stop and a second stop. The extender is pivotable between the first stop and the second stop when engaged with the upper retainer such that the handle member correspondingly pivots between a first position and a second position, wherein when the extender engages the second stop, the handle member is in the second position and the does not contact the animal. The release may be formed in an outer surface of the extender and the magnet may be housed in an inner surface of the extender. The magnet of the extender may be positioned on the release tab. Activating the release disengages the extender from the upper retainer but maintains the magnetic engagement between the magnet and the magnetic surface until the magnetic engagement is overcome. The harness may further comprise an adjustable strap having a magnetic buckle. The harness may be substantially spherical. The harness may further comprise a ring that receives a first clasp affixed to a leash having a predetermined length. The leash may further comprise a second clasp that can attach to the first clasp or along positions on the leash to adjust the predetermined length of the leash. The handle member may further comprise a second elongated support. The harness system may further comprise a second coupling mechanism. The second coupling mechanism may comprise a second receiver affixed to the harness having a second magnetic surface; a second latch protruding from the second magnetic surface; and a second upper retainer extending from the second magnetic surface, thereby defining a second receiving channel; and a second extender coupled to the second elongated support, wherein the second extender includes a second release tab and a second magnet.

Another implementation of the disclosed technology provides a harness system for an animal. The harness system comprises a harness defining a first opening for the animal's neck and a second opening for the animal's back; a handle member having a first elongated support and a second elongated support; a first receiver and a second receiver, wherein both the first receiver and a second receiver include a magnetic surface; a latch protruding from the magnetic surface; and an upper retainer, thereby defining a receiving channel; and a first extender coupled to the first elongated support and a second extender coupled to the second elongated support, where both the first extender and the second extender include a release tab and a magnet.

The magnetic surface of the first and second receiver attractively engages the magnet on the first and second extender, respectively, wherein the first and second extender are guided through their corresponding receiving channel. The first and second extender displaces their corresponding latch on the first and second receiver until the first and second extender lock into engagement with their corresponding upper retainer. The first and second extender are mutually pivotable when engaged with their respective upper retainer such that the handle member correspondingly pivots between a first position and a second position, wherein the handle member does not contact the animal when the handle member is in the second position. The magnet may be positioned on the release tab. Activating the release disengages the corresponding first and second extender from the upper retainer but maintains the magnetic engagement between the magnet and the magnetic surface until the magnetic engagement is overcome. The harness may further comprise an adjustable strap having a magnetic buckle; and a ring attached to the top side of the harness, wherein the ring receives a first clasp affixed to a leash having a predetermined length. The leash may further comprise a second clasp that can attach to the first clasp or along positions on the leash to adjust the predetermined length of the leash.

It should be appreciated that all combinations of the foregoing concepts and additional concepts discussed in greater detail below (provided such concepts are not mutually inconsistent) are contemplated as being part of the technology disclosed herein and may be implemented to achieve the benefits as described herein. Additional features and aspects of the disclosed system, devices, and methods will become apparent to those of ordinary skill in the art upon reading and understanding the following detailed description of the example implementations. As will be appreciated by the skilled artisan, further implementations are possible without departing from the scope and spirit of what is disclosed herein. Accordingly, the drawings and associated descriptions are to be regarded as illustrative and not restrictive in nature.

BRIEF DESCRIPTION OF THE DRAWINGS

The accompanying drawings, which are incorporated into and form a part of the specification, schematically illustrate one or more example implementations of the disclosed technology and, together with the general description given above and detailed description given below, serve to explain the principles of the disclosed subject matter, and wherein.

DETAILED DESCRIPTION

Example implementations are now described with reference to the Figures. Reference numerals are used throughout the detailed description to refer to the various elements and structures. Although the following detailed description contains many specifics for the purposes of illustration, a person of ordinary skill in the art will appreciate that many variations and alterations to the following details are within the scope of the disclosed technology. Accordingly, the following implementations are set forth without any loss of generality to, and without imposing limitations upon, the claimed subject matter.

The examples discussed herein are examples only and are provided to assist in the explanation of the apparatuses, devices, systems, and methods described herein. None of the features or components shown in the drawings or discussed below should be taken as required for any specific implementation of any of these the apparatuses, devices, systems or methods unless specifically designated as such. For ease of reading and clarity, certain components, modules, or methods may be described solely in connection with a specific Figure. Any failure to specifically describe a combination or sub-combination of components should not be understood as an indication that any combination or sub-combination is not possible. Also, for any methods described, regardless of whether the method is described in conjunction with a flow diagram, it should be understood that unless otherwise specified or required by context, any explicit or implicit ordering of steps performed in the execution of a method does not imply that those steps must be performed in the order presented but instead may be performed in a different order or in parallel.

The invention is described more fully hereinafter with reference to the accompanying drawings, in which exemplary embodiments of the invention are shown. This invention may, however, be embodied in many different forms and should not be construed as limited to the exemplary embodiments set forth herein. Rather, these embodiments are provided so that this disclosure will be thorough and complete, and will fully convey the scope of the invention to those skilled in the art. In the drawings, the size and relative sizes of layers and regions may be exaggerated for clarity.

The terminology used herein is for the purpose of describing particular embodiments only and is not intended to be limiting of the invention. As used herein, the singular forms "a", "an" and "the" are intended to include the plural forms as well, unless the context clearly indicates otherwise. Similarly, the use of the word "or" is intended to be non-exclusive unless the context clearly indicates otherwise. It will be further understood that the terms "comprises" or "comprising," when used in this specification, specify the presence of stated features, integers, steps, operations, elements, or components, but do not preclude the presence or addition of one or more other features, integers, steps, operations, elements, components, or groups thereof.

Embodiments of the invention are described herein with reference to illustrations that are schematic illustrations of idealized embodiments (and intermediate structures) of the invention. As such, variations from the shapes of the illustrations as a result, for example, of manufacturing techniques or tolerances, are to be expected. Thus, embodiments of the invention should not be construed as limited to the particular shapes of regions illustrated herein but are to include deviations in shapes that result, for example, from manufacturing.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Figure 1:
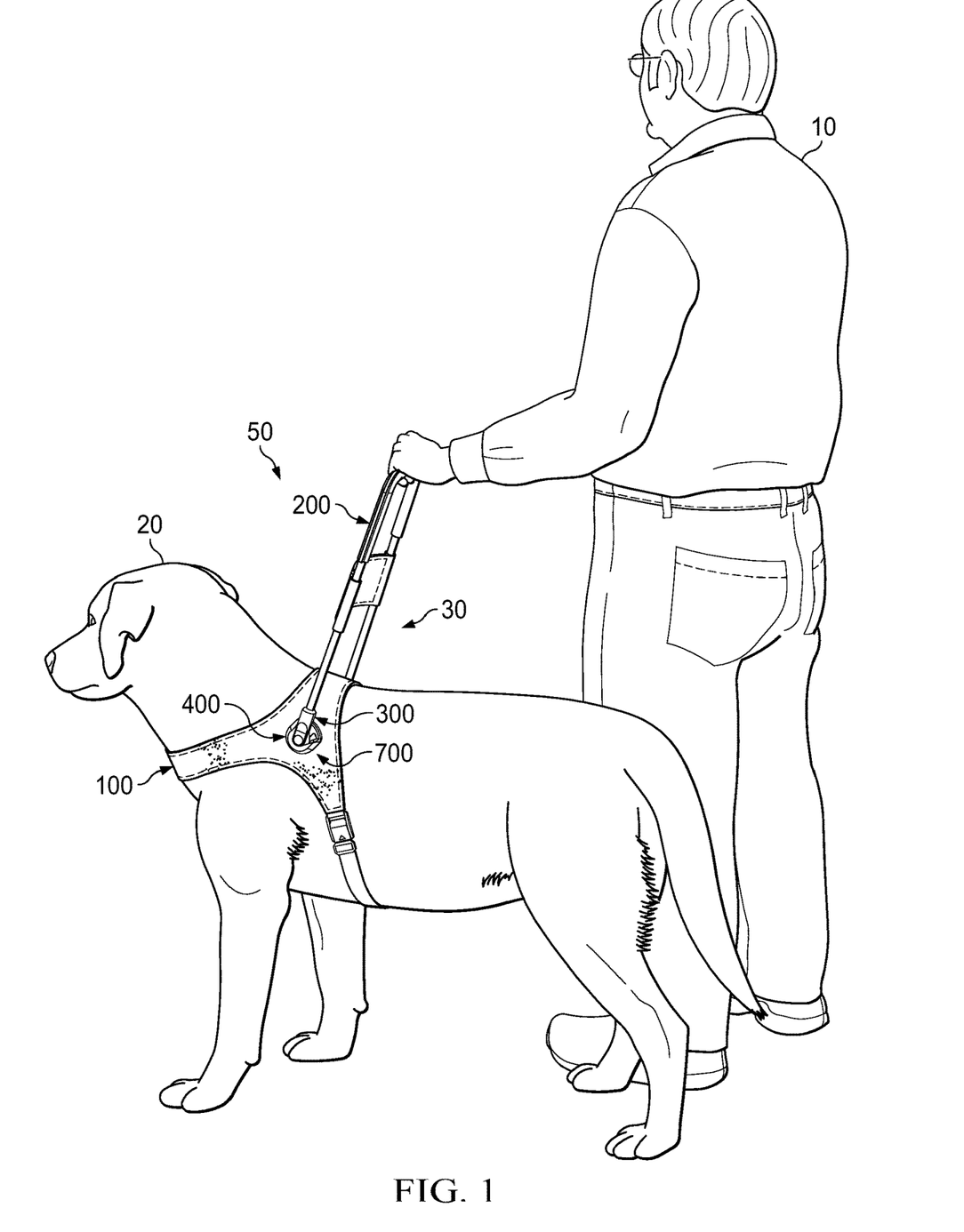
FIG. 1 depicts an example implementation of the disclosed system positioned on a dog showing a harness, a handle member, and an extender engaged with a receiver, wherein the handle member is in a first position.
Figure 2:
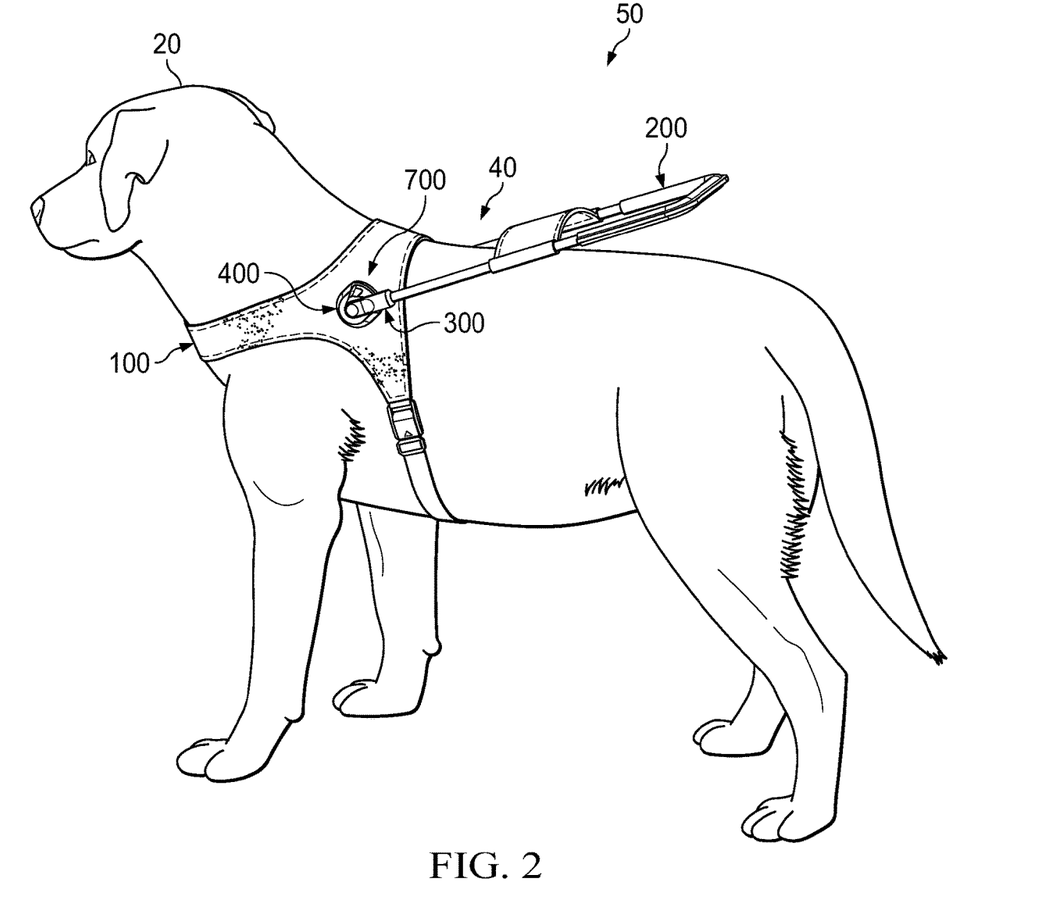
FIG. 2 is a perspective view of FIG. 1, wherein the handle member is in a second position.

With reference to the figures, FIGS. 1-2 depict an exemplary implementation of a harness system 50, in a fully assembled configuration, positioned on an exemplary animal 20, such as a dog. In the present embodiment, the harness system 50 includes a harness 100 having receivers 400 and handle member 200 having extenders 300. Each complimentary pair of extender 300 and receiver 400 functions as a coupling mechanism 700 enabling quick, guided attachment and detachment of the handle member 200 to and from the harness 100. FIG. 1 depicts extenders 300 fully engaged with receivers 400 on harness 100 such that handle member 200 is in first position 30 for user 10 to hold. When fully engaged, extenders 300 can freely pivot within their corresponding receivers 400 to move handle member 200 between first position 30 and second position 40 (see FIG. 2). Handle member 200 does not come in contact with dog 20 when in second position 40, regardless of whether the user 10 is supporting the handle member 200, and thereby preventing the handle member 200 from striking dog 20 if user 10 releases handle member 200.

Figure 3:
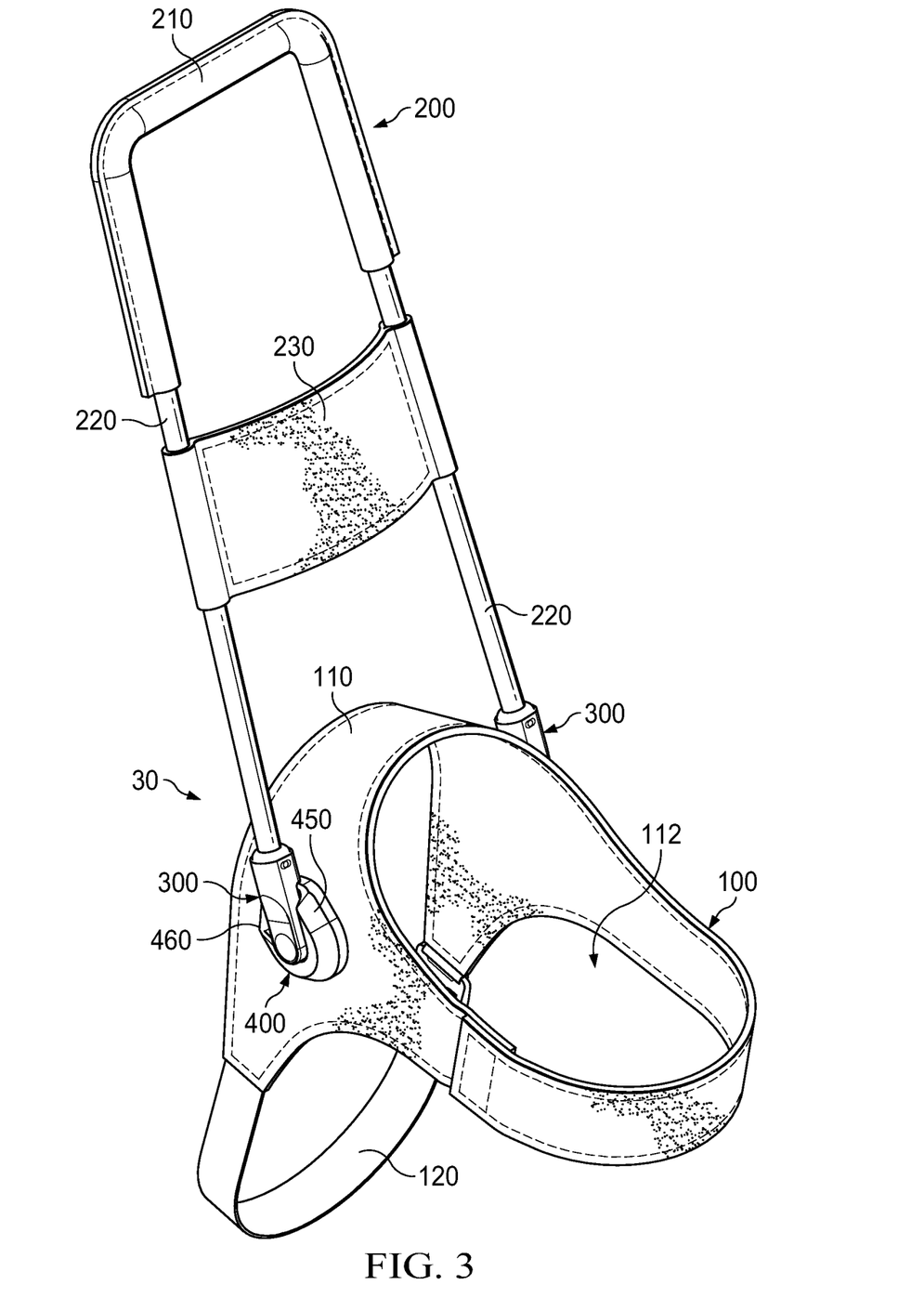
FIG. 3 is a perspective view of the harness and handle member of FIG. 1 in an assembled configuration.

FIG. 3 further depicts a rear elevated perspective view of the exemplary harness system 50, wherein the handle member 200 connected to the harness 100 such that the handle member 200 is in a first position 30. Handle member 200 includes grip 210 with elongate supports 220 extending from a grip 210 at a distal end of the handle member 200. The extenders 300 are each coupled to one of the corresponding proximal ends of the elongate supports 220. In the present, non-limiting embodiment, elongate supports 220 are tubular-shaped and form a generally U-shaped handle member 200. It is to be understood that the elongate supports 220 can be any shape reasonably necessary to define handle member 200. Handle member 200 may further include guard or support 230 positioned between the elongate supports 220. The grip 210 may preferably be embodied in a leather wrap or any other similar material covering a portion of the handle member 200, or may be optionally provided as a separate part and coupled to the one or more elongate supports.

Figure 4:
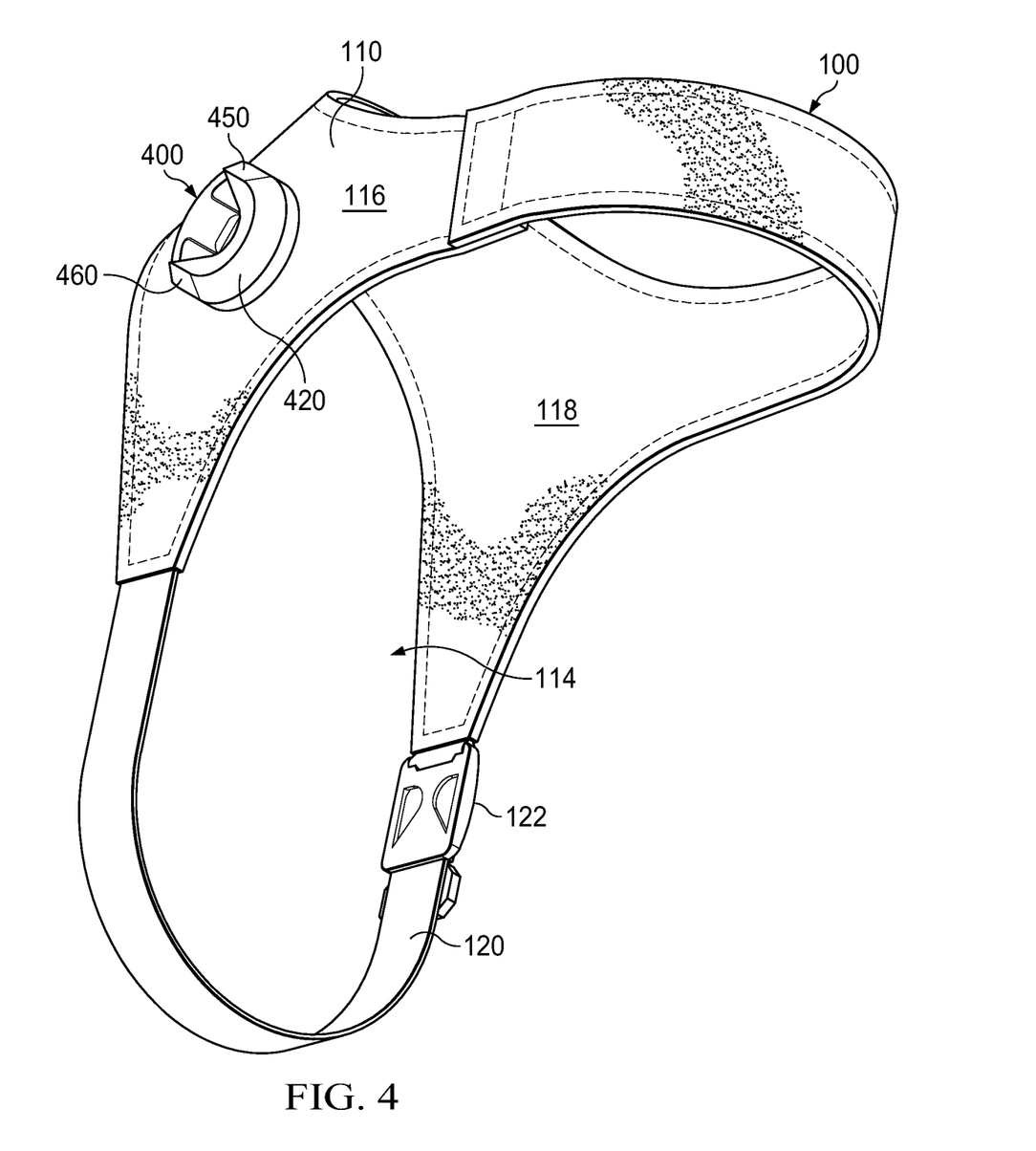
FIG. 4 is a bottom view of the harness and handle member assembly of FIG. 3.

FIG. 4 further depicts a lower perspective view of harness 100. With reference to FIGS. 3-4, the harness 100 comprises a body 110 having outer surface 116 and inner surface 118, wherein body 110 defines first opening 112 and second opening 114. First opening 112 is configured to receive the head of dog 20 and be worn about the neck, should and chest area, and second opening 114 is configured to receive the back of dog 20 (see FIGS. 1-2). In the present exemplary embodiment, body 110 of harness 100 is formed from a uniform and integral piece of material. In one non-limiting example, body 110 can be formed from a single piece of stitched leather. Other similar materials may be used in forming the body 110 of harness 100. Harness 100 may further comprise adjustable strap 120 that connects on the underside of dog 20 via a release, such as buckle 122. In the present exemplary embodiment, buckle 122 is magnetic to allow for quick attachment and release. In additional embodiments, buckle 122 may be a conventional snap buckle, roller buckle, bridle buckle, or other similar attachment device without departing from the scope of the instant disclosure.

Figure 5:
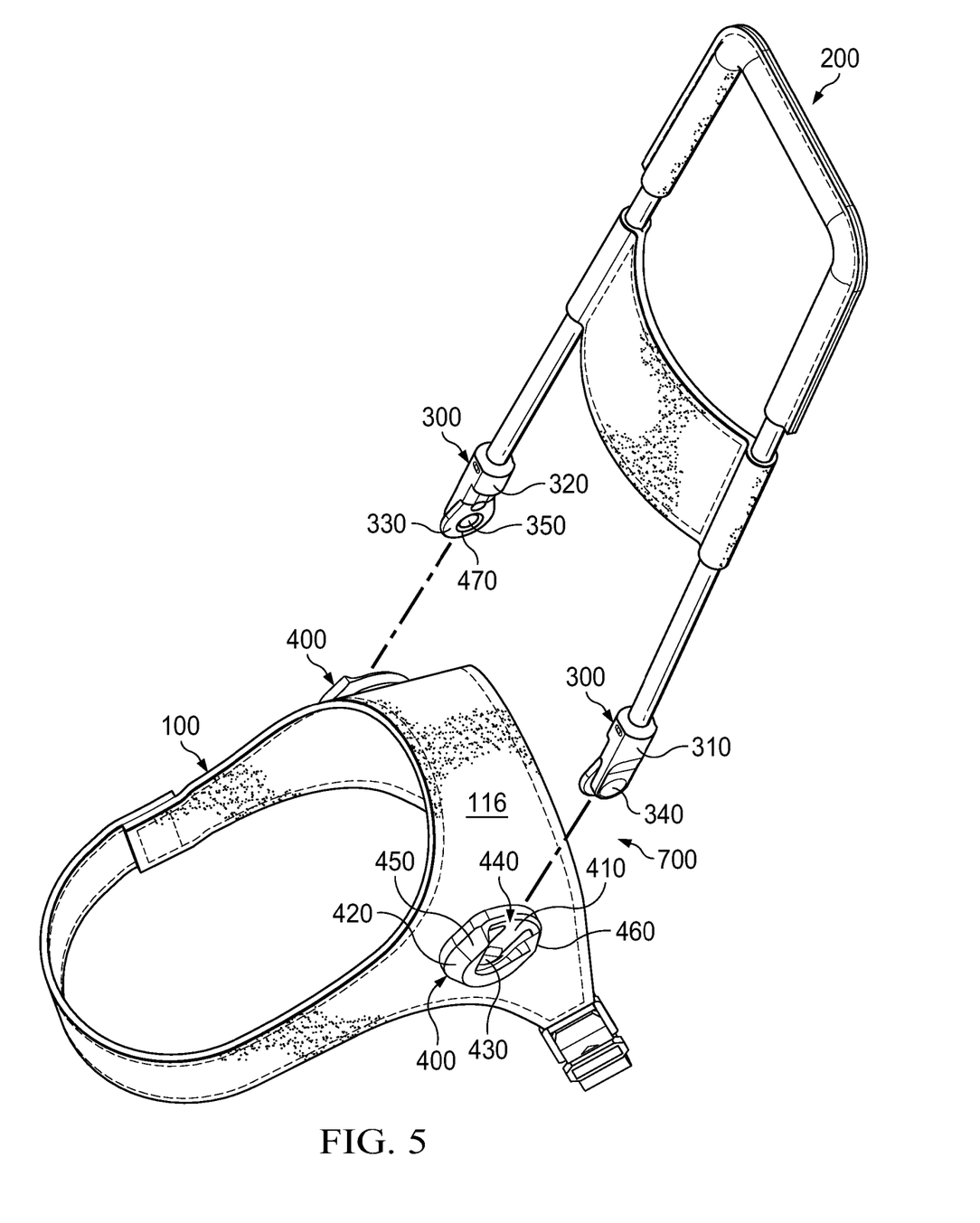
FIG. 5 is a detail view of a coupling mechanism, wherein the coupling mechanism includes the extender and the receiver of FIG. 1.

FIG. 5 depicts an exploded view of the exemplary harness system 50 illustrating aspects of an exemplary attachment of the handle member 200 with the harness 100 through one or more coupling mechanisms 700. In the present embodiment, a pair of receivers 400 are affixed to the harness 100 on opposing sides of its outer surface 116. Receivers 400 include magnetic surface 410, upper retainer 420 extending from magnetic surface 410, and latch 430 protruding from magnetic surface 410. Upper retainer 420 of receivers 400 define first stop 450 and second stop 460. Preferably, the upper retainer 420 of the receivers 400 are shaped to further comprise receiving channel 440 to accept male end 330 of extenders 300. The shape of receiving channels 440 correspond to the shape of male ends 330 of extenders 300. In the present embodiment, receiving channels 440 are U-shaped to receive circular shaped male ends 330. In one exemplary embodiment, the receivers are spherical or substantial spherical in shape. In another embodiment, the receivers can be any shape necessary to receive complimentarily shaped extenders.

In one exemplary embodiment, extenders 300 include top surface 310 and bottom surface 320, wherein male end 330 is formed on bottom surface 320 and extends a distance past top surface 310. In the present embodiment, male end 330 of extenders 300 are circular in shape to correspond to the U-shape of receiving channels 440. Male ends 330 can be any shape necessary to correspond with the shape of receiving channels 440. Top surface 310 of extenders 300 include release tab 340, and bottom surface 320 of extenders 300 include magnetic element 350. In the present embodiment, magnetic element 350 is formed on release tab 340. In another exemplary embodiment, magnetic element 350 is formed on any position on bottom surface 320 of extenders 300. In a preferred embodiment, the magnetic element is a permanent magnet and the magnetic surface includes a ferromagnetic material. In another preferred embodiment, the magnetic element and the magnetic surface are both provided as permanent magnets with complimentary attractive pole arrangements, such that the two members are more easily guided into contact when attaching the handle to the harness. Regardless of the particular arrangement of magnetic materials, those skilled in the art will appreciate that other combinations of magnetic materials may be implemented without departing from the scope of the present disclosure.

With reference to FIGS. 3 and 5, the magnetic surface 410 of each of the receivers 400 attractively engage a magnetic element 350 on each of the respective extenders 300. The magnetic attraction between magnetic surface 410 and magnetic element 350 is sufficiently strong to attach magnetic element 350 to magnetic surface 410, while allowing magnetic element 350 to move along magnetic surface 410, thereby guiding the male ends 330 into corresponding receiving channels 440. As the male ends 330 move into the respective receiving channels 440, the bottom surface 320 of the extenders 300 displace the latch 430 until male end 330 of extenders 300 lock into engagement with upper retainer 420. The extender 300 includes a complimentary latch feature 470, such as a detent or lip, into which the displaced latch 430 engages when the extender 300 is fully seated within the receiver 400. Once extenders 300 are fully engaged within receivers 400, extenders 300 can freely pivot between first stop 450 and second stop 460 of upper retainer 420. Pivoting extenders 300 between first stop 450 and second stop 460 correspondingly pivots the handle member 200 to its first position 30 and second position 40.

Further referring to FIG. 5, to disengage handle member 200 from harness 100, release tab 340 is compressed, thereby disengaging male end 330 of extenders 300 from upper retainer 420 of receivers 400 by displacing the latch 430 such that it disengages from the complimentary latch feature 470. Magnetic element 350 maintains its magnetic engagement with magnetic surface 410 despite male end 330 disengaging from upper retainer 420. The magnetic engagement is overcome when sufficient force is applied to remove handle member 200 from harness 100.

Figure 6:
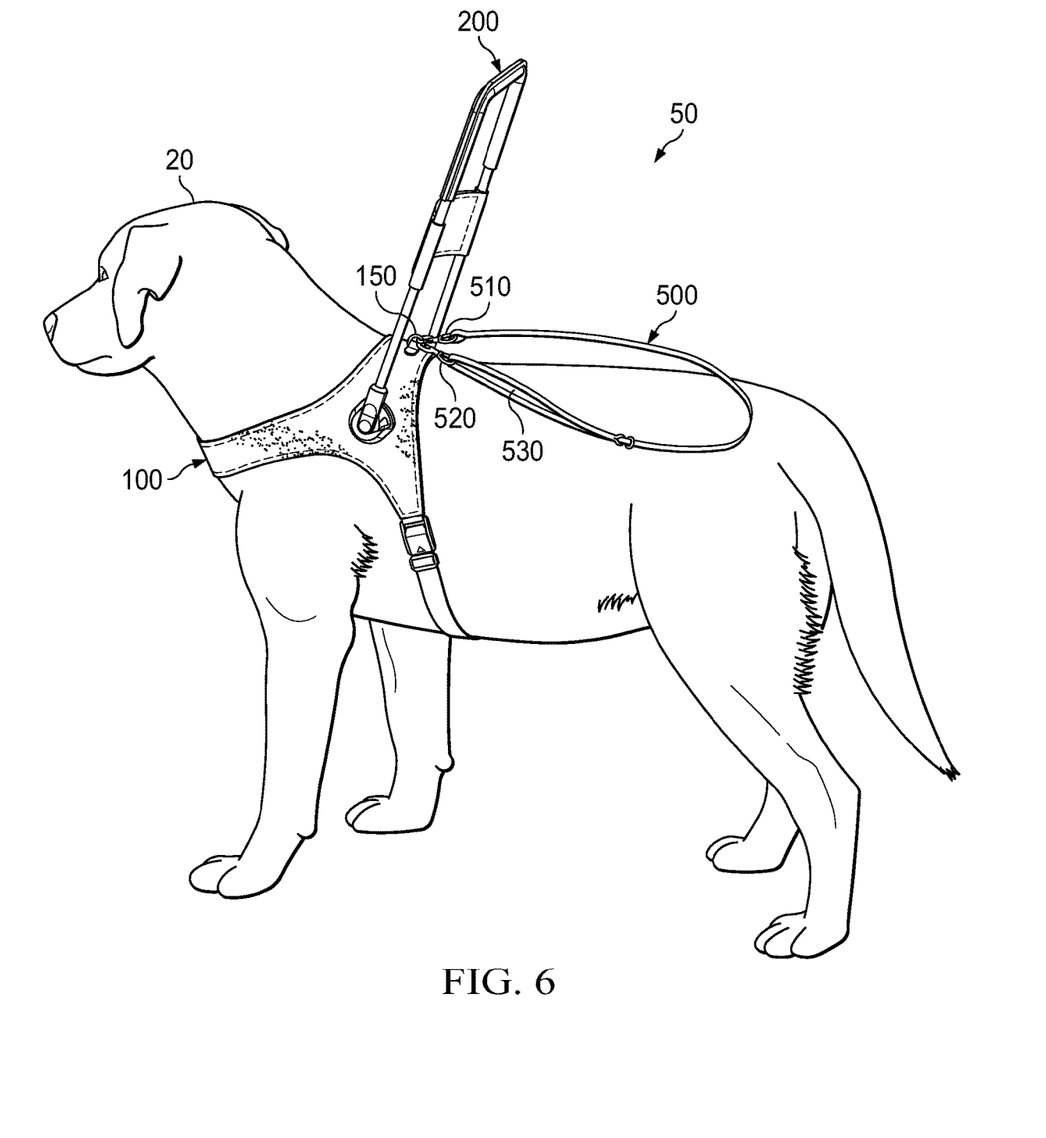
FIG. 6 depicts another example implementation of the disclosed system positioned on a dog showing a harness with a ring and a leash attached to the ring.

FIG. 6 depicts another exemplary implementation of a harness system 50 positioned on exemplary animal, such as dog 20 and illustrating a harness 100 further comprising ring 150, wherein a leash 500 is attached to ring 150. In the present embodiment, leash 500 includes first clasp 510 and second clasp 520, wherein first and second clasps may be attached to the ring 150, and wherein first clasp 510 is larger than second clasp 520. It is to be understood that first clasp 510 and second clasp 520 can be the same or different sizes, have the same of different weight and strength ratings, and that either clasp can be attached to hook 150 in lieu of the other as will be further described below. FIG. 6 depicts leash 500 in a medium length orientation providing a predetermined intermediate distance between a user and the animal 20 when in normal use. It may also be preferable to attach one of the clasps to the other, while the remaining clasp is attached to the attachment point 150. These configurations also have the additional benefit of providing a secondary short leash handle loop 530 for use in situations wherein close control is desired.

Figure 7:
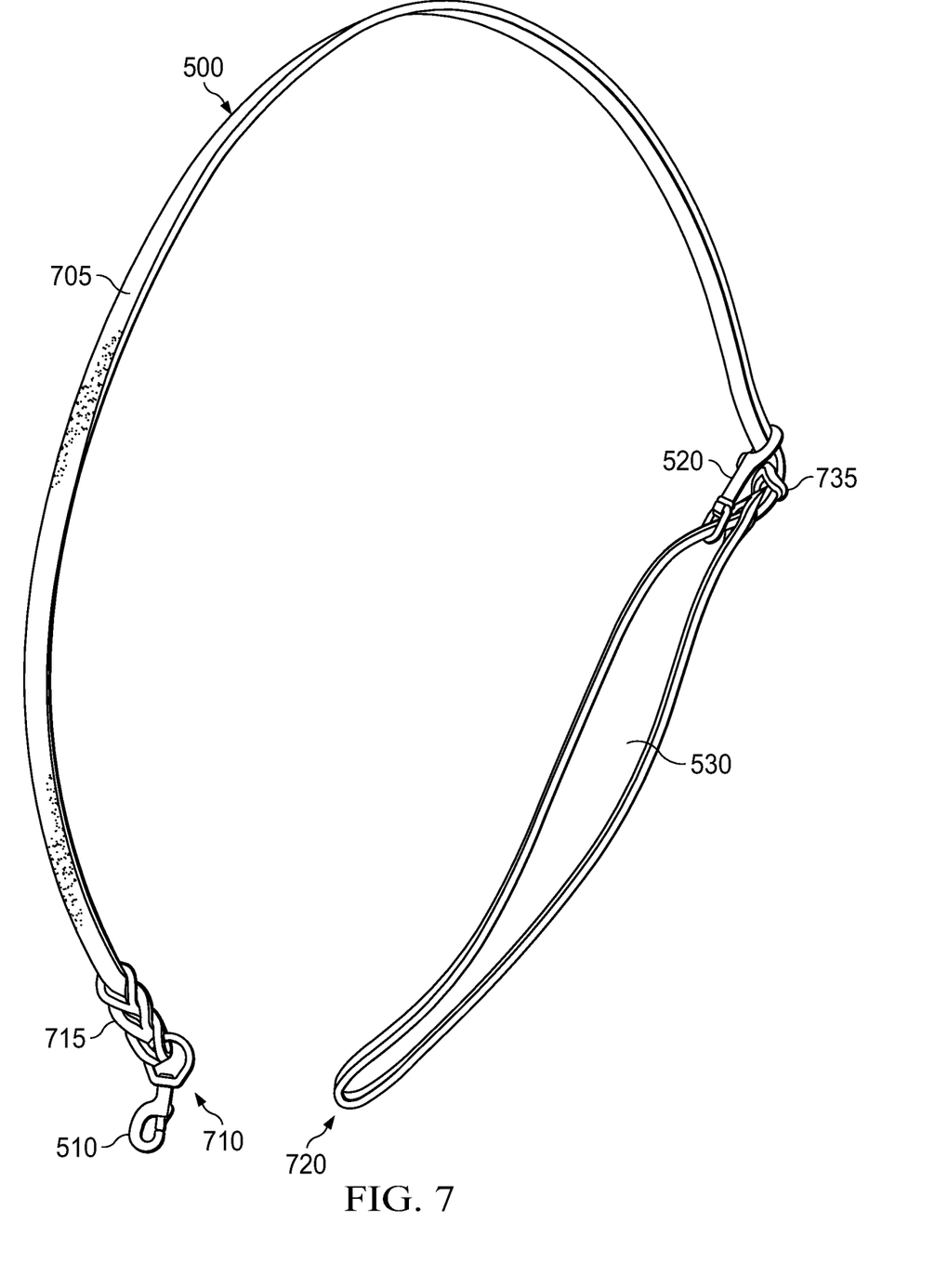
FIG. 7 is a perspective view of the leash of FIG. 6 in an alternative configuration.

The predetermined length of leash 500 can be variably reduced based on the amount of control a user requires of the dog 20. Turning to FIG. 7, the exemplary leash 500 is illustrated in an extended length orientation, primarily assembled with a leather strip 705, a first clasp 510 and a second clasp 520. The exemplary leash 500 is shown to include a first clasp 510 at a proximal end 710. In this embodiment, the first clasp 510 is secured to the leash 500 by weaving the proximal end 710 of the leather strip 705, although those skilled in the art will appreciate that other methods may be used to secure the clasp, such as stitching, riveting or the like, without departing from the scope of the present disclosure. The particular weave 715 illustrated in connection with FIG. 7 is considered preferable due in part to its strength, low cost of manufacture, and the resulting absence of fasteners which may irritate or harm the animal or user in certain circumstances.

The exemplary leash 500 also includes a secondary short leash handle loop 530 at a distal end 720, preferably formed by a handle weave 735. In the present embodiment, second clasp 520 can attach to the leash 500 at the handle loop 530 and can be attached to move freely around the loop 530. In the extended length orientation illustrated in connection with FIG. 7, the second clasp 520 is moved around the handle loop 530 away from the distal end 720 of the leash 500 and attached just beneath the handle weave 735. In this orientation, the maximum length of the leash 500 is realized and the second clasp 520 is safely stored away. Furthermore, the handle loop 530 can be used as the leash handle under normal operating circumstances by a user.

Figure 8:
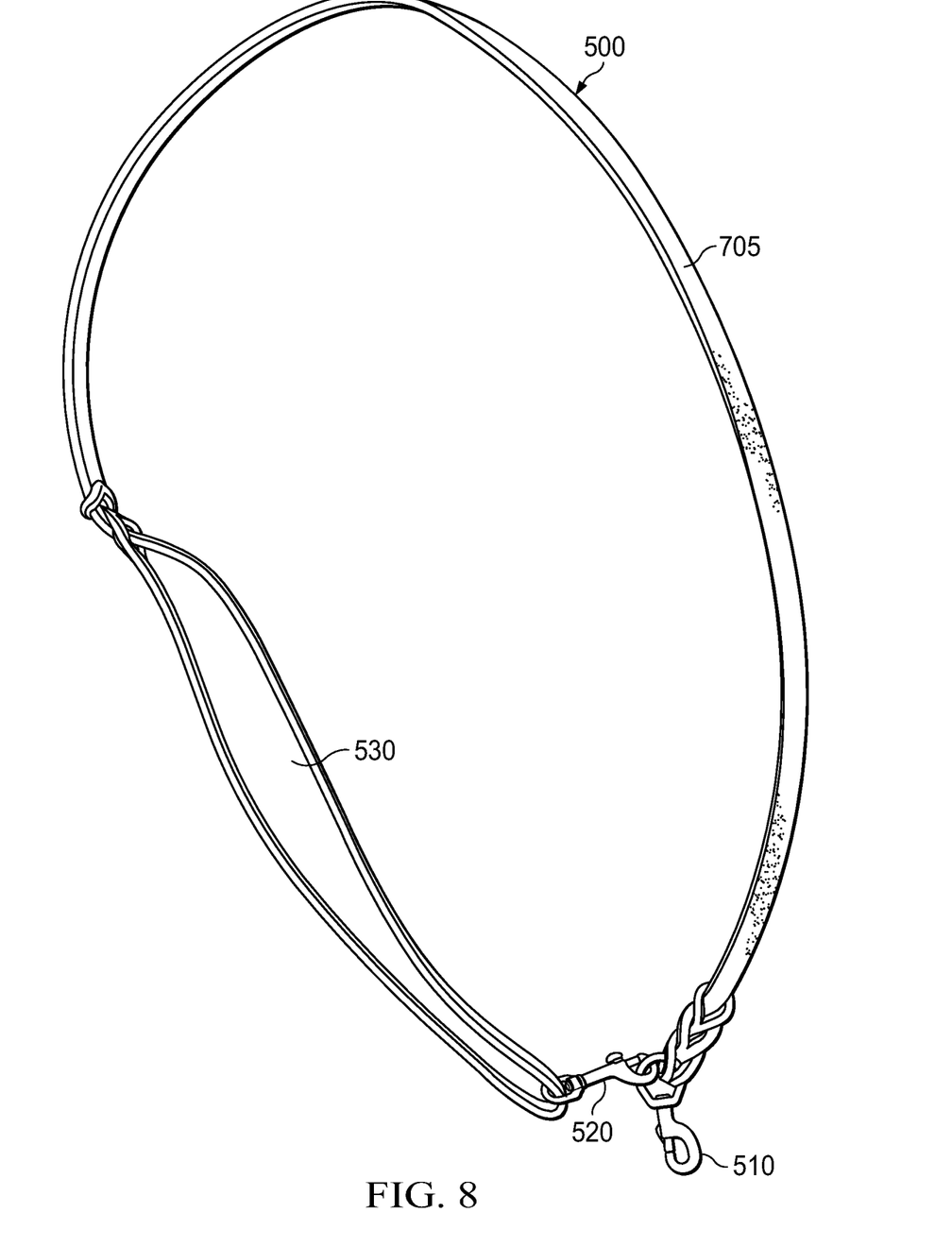
FIG. 8 is a perspective view of the leash of FIG. 6 in yet another alternative configuration.

Turning to FIG. 8, the exemplary leash 500 is illustrated in a medium length orientation, wherein the second clasp 520 is attached to the first clasp 510, forming a leash length similar in size to that shown in connection with FIG. 6. This orientation permits the user to take advantage of a medium length leash while also providing the added convenience of a secondary short leash handle loop 530 for use in situations wherein close control is desired. In one non-limiting embodiment, the leash 500 is primarily constructed from a leather strip 705. Those skilled in the art, however, will appreciate that the leash can be any other suitable material, including but not limited to, nylon, rope, or chain.

Having shown and described a preferred embodiment of the invention, those skilled in the art will realize that many variations and modifications may be made to affect the described invention and still be within the scope of the claimed invention. Additionally, many of the elements indicated above may be altered or replaced by different elements which will provide the same result and fall within the spirit of the claimed invention. It is the intention, therefore, to limit the invention only as indicated by the scope of the claim.

All literature and similar material cited in this application, including, but not limited to, patents, patent applications, articles, books, treatises, and web pages, regardless of the format of such literature and similar materials, are expressly incorporated by reference in their entirety. Should one or more of the incorporated references and similar materials differs from or contradicts this application, including but not limited to defined terms, term usage, described techniques, or the like, this application controls.

As previously stated and as used herein, the singular forms "a", "an", and "the" refer to both the singular as well as plural, unless the context clearly indicates otherwise. The term "comprising" as used herein is synonymous with "including", "containing" or "characterized by" and is inclusive or open-ended and does not exclude additional, unrecited elements or method steps. Although many methods and materials similar or equivalent to those described herein can be used, particular suitable methods and materials are described herein. Unless context indicates otherwise, the recitations of numerical ranges by endpoints include all numbers subsumed within that range. Furthermore, references to "one implementation" are not intended to be interpreted as excluding the existence of additional implementations that also incorporate the recited features. Moreover, unless explicitly stated to the contrary, implementations "comprising" or "having" an element or a plurality of elements having a particular property may include additional elements whether or not they have that property.

The terms "substantially" and "about" describe and account for small fluctuations, such as due to variations in processing or operational ranges that are evident from the disclosure to those skilled in the art, for instance. For example, these terms can refer to less than or equal to ±5%, such as less than or equal to ±2%, such as less than or equal to ±1%, such as less than or equal to ±0.5%, such as less than or equal to ±0.2%, such as less than or equal to ±0.1%, such as less than or equal to ±0.05%, or 0%.

Underlined or italicized headings and subheadings are used for convenience only, do not limit the disclosed subject matter, and are not referred to in connection with the interpretation of the description of the disclosed subject matter. All structural and functional equivalents to the elements of the various implementations described throughout this disclosure that are known or later come to be known to those of ordinary skill in the art are expressly incorporated herein by reference and intended to be encompassed by the disclosed subject matter. Moreover, nothing disclosed herein is intended to be dedicated to the public regardless of whether such disclosure is explicitly recited in the above description.

There may be many alternate ways to implement the disclosed technology. Various functions and elements described herein may be partitioned differently from those shown without departing from the scope of the disclosed technology. Generic principles defined herein may be applied to other implementations. Different numbers of a given module or unit may be employed, a different type or types of a given module or unit may be employed, a given module or unit may be added, or a given module or unit may be omitted.

Regarding this disclosure, the term "a plurality of" refers to two or more than two. Unless otherwise clearly defined, orientation or positional relations indicated by terms such as "upper" and "lower" are based on the orientation or positional relations as shown in the Figures, only for facilitating description of the disclosed technology and simplifying the description, rather than indicating or implying that the referred devices or elements must be in a particular orientation or constructed or operated in the particular orientation, and therefore they should not be construed as limiting the disclosed technology. The terms "connected", "mounted", "fixed", etc. should be understood in a broad sense. For example, "connected" may be a fixed connection, a detachable connection, or an integral connection, a direct connection, or an indirect connection through an intermediate medium. For an ordinary skilled in the art, the specific meaning of the above terms in the disclosed technology may be understood according to specific circumstances.

It should be appreciated that all combinations of the foregoing concepts and additional concepts discussed in greater detail herein (provided such concepts are not mutually inconsistent) are contemplated as being part of the disclosed technology. In particular, all combinations of claimed subject matter appearing at the end of this disclosure are contemplated as being part of the technology disclosed herein. While the disclosed technology has been illustrated by the description of example implementations, and while the example implementations have been described in certain detail, there is no intention to restrict or in any way limit the scope of the appended claims to such detail. Additional advantages and modifications will readily appear to those skilled in the art. Therefore, the disclosed technology in its broader aspects is not limited to any of the specific details, representative devices and methods, and/or illustrative examples shown and described. Accordingly, departures may be made from such details without departing from the spirit or scope of the general inventive concept.

What is claimed:

1. A harness system for an animal, comprising:
an integrally formed harness positionable on the animal;
a handle member having at least one elongated support; and
at least one coupling mechanism comprising:
a receiver affixed to the harness comprising
a magnetic surface;
a latch protruding from the magnetic surface; and
an upper retainer defining a receiving channel; and
an extender coupled to the at least one elongated support, wherein the extender comprises:
a release tab; and
a magnetic element,
wherein the magnetic surface attractively engages with the magnet element to guide the extender into the receiving channel, and wherein the extender displaces the latch until the extender locks into engagement with the upper retainer.

2. The system of claim 1, wherein the upper retainer includes a first stop and a second stop.

3. The system of claim 2, wherein the extender is pivotable between the first stop and the second stop when engaged with the upper retainer such that the handle member correspondingly pivots between a first position and a second position, wherein when the extender engages the second stop, the handle member is in the second position and does not contact the animal.

4. The system of claim 1, wherein the release is formed in an outer surface of the extender and the magnetic element is housed in an inner surface of the extender.

5. The system of claim 1, wherein the magnetic element is positioned within the release tab.

6. The system of claim 1, wherein activating the release disengages the latch from the extender.

7. The system of claim 1, wherein the harness further comprises an adjustable strap having a magnetic buckle.

8. The system of claim 1, wherein the harness is substantially spherical.

9. The system of claim 1, wherein the harness further comprise a ring that receives a first clasp affixed to a leash having a predetermined length.

10. The system of claim 9, wherein the leash further comprises a second clasp that can attach to the first clasp or along positions on the leash to adjust the predetermined length of the leash.

11. The system of claim 1, wherein the handle member further comprises a second elongated support.

12. The system of claim 11, further comprising a second coupling mechanism, comprising:
a second receiver affixed to the harness comprising
a magnetic surface;
a latch protruding from the magnetic surface; and
an upper retainer defining a receiving channel; and
a second extender coupled to the at least one elongated support, wherein the extender comprises:
a release tab; and
a magnetic element.

13. A harness system for an animal, comprising:
a harness defining a first opening for the animal's neck and a second opening for the animal's back;
a handle member having a first elongated support and a second elongated support;
a first receiver and a second receiver, each comprising:
a magnetic surface;
a latch protruding from the magnetic surface; and
an upper retainer defining a receiving channel; and
a first extender coupled to the first elongated support and a second extender coupled to the second elongated support, each extender comprising:
a release tab; and
a magnet.

14. The system of claim 13, wherein the magnetic surface of the first and second receiver attractively engages the magnet on the first and second extender, respectively, wherein the first and second extender are guided through their corresponding receiving channel.

15. The system of claim 14, wherein the first and second extender displaces their corresponding latch on the first and second receiver until the first and second extender lock into engagement with their corresponding upper retainer.

16. The system of claim 15, wherein the first and second extender are mutually pivotable when engaged with their respective upper retainer such that the handle member correspondingly pivots between a first position and a second position, wherein the handle member does not contact the animal when the handle member is in the second position.

17. The system of claim 13, wherein the magnet is positioned on the release tab.

18. The system of claim 13, wherein activating the release disengages the corresponding first and second extender from the upper retainer but maintains the magnetic engagement between the magnet and the magnetic surface until the magnetic engagement is overcome.

19. The system of claim 13, wherein the harness further comprises an adjustable strap having a magnetic buckle; and a ring attached to the top side of the harness, wherein the ring receives a first clasp affixed to a leash having a predetermined length.

20. The system of claim 19, wherein the leash further comprises a second clasp that can attach to the first clasp or along positions on the leash to adjust the predetermined length of the leash.

\* \* \* \* \*